(12) United States Patent
Smith

(10) Patent No.: US 7,883,105 B2
(45) Date of Patent: *Feb. 8, 2011

(54) VEHICLE SEAT ASSEMBLY WITH DEFLECTOR INNER PANEL AIR BAG GUIDE RETAINER

(75) Inventor: Rodger G. Smith, Ludlow (GB)

(73) Assignee: Lear Corporation, Southfield, MI (US)

( * ) Notice: Subject to any disclaimer, the term of this patent is extended or adjusted under 35 U.S.C. 154(b) by 214 days.

This patent is subject to a terminal disclaimer.

(21) Appl. No.: 12/057,760

(22) Filed: Mar. 28, 2008

(65) Prior Publication Data

US 2009/0243266 A1 Oct. 1, 2009

(51) Int. Cl.
B60R 21/207 (2006.01)
(52) U.S. Cl. .................................................. 280/730.2
(58) Field of Classification Search .............. 280/728.2, 280/728.3, 730.2; 297/216.1, 216.13
See application file for complete search history.

(56) References Cited

U.S. PATENT DOCUMENTS

| 5,601,332 | A | * | 2/1997 | Schultz et al. ......... 297/216.13 |
| 5,749,597 | A | | 5/1998 | Saderholm |
| 5,816,610 | A | | 10/1998 | Higashiura et al. |
| 5,927,749 | A | | 7/1999 | Homier et al. |
| 5,997,032 | A | | 12/1999 | Miwa et al. |
| 6,045,151 | A | | 4/2000 | Wu |
| 6,237,934 | B1 | | 5/2001 | Harrell et al. |
| 6,364,347 | B1 | * | 4/2002 | Holdampf et al. ......... 280/730.2 |
| 6,382,665 | B2 | * | 5/2002 | Holdampf et al. ......... 280/730.2 |
| 6,386,577 | B1 | * | 5/2002 | Kan et al. ................. 280/730.2 |
| 6,439,597 | B1 | * | 8/2002 | Harada et al. ............ 280/728.2 |
| 6,578,911 | B2 | * | 6/2003 | Harada et al. .......... 297/216.13 |
| 6,588,838 | B1 | | 7/2003 | Dick, Jr. et al. |
| 7,341,275 | B2 | * | 3/2008 | Miyake et al. ........... 280/730.2 |
| 2006/0113761 | A1 | | 6/2006 | Tracht |
| 2006/0113772 | A1 | * | 6/2006 | Tracht ..................... 280/730.2 |
| 2006/0131848 | A1 | | 6/2006 | Miyake et al. |
| 2008/0100044 | A1 | * | 5/2008 | Cho ........................ 280/730.2 |
| 2009/0243263 | A1 | * | 10/2009 | Smith ...................... 280/728.2 |

FOREIGN PATENT DOCUMENTS

WO    00/06426 A1    2/2000

\* cited by examiner

*Primary Examiner*—Paul N Dickson
*Assistant Examiner*—Joseph Rocca
(74) *Attorney, Agent, or Firm*—Brooks Kushman P.C.

(57) ABSTRACT

In at least certain embodiments, the vehicle seat assembly comprises a vehicle seat assembly comprising an air bag guide including an inner panel, an outer panel, and a deflector member, with the and outer panels being made of flexible material and the inner deflector member being made of a rigid material, with the deflector member having a leg member secured to the air bag assembly and a finger member, extending away from the leg member spaced from the release seam.

18 Claims, 2 Drawing Sheets

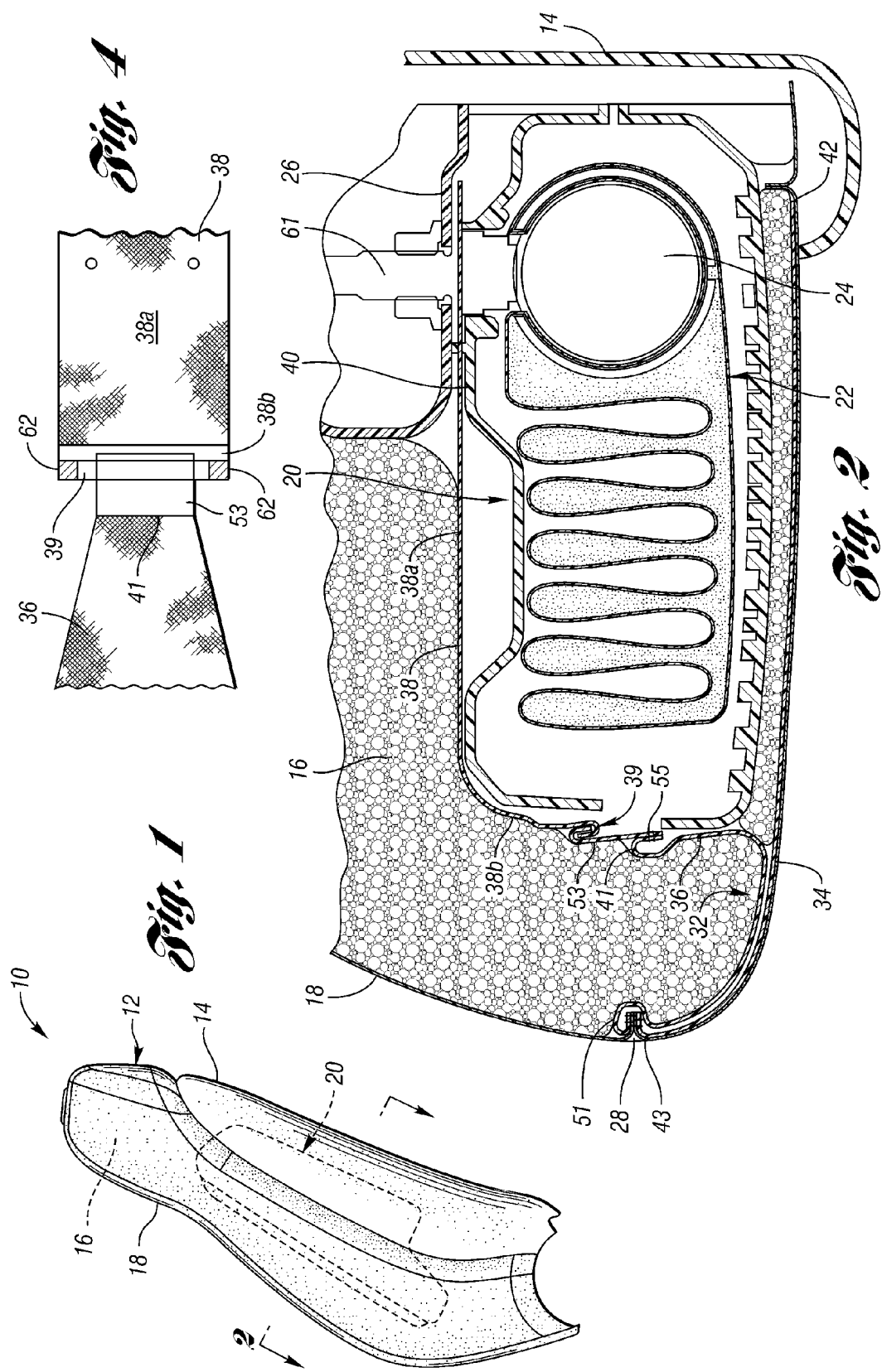

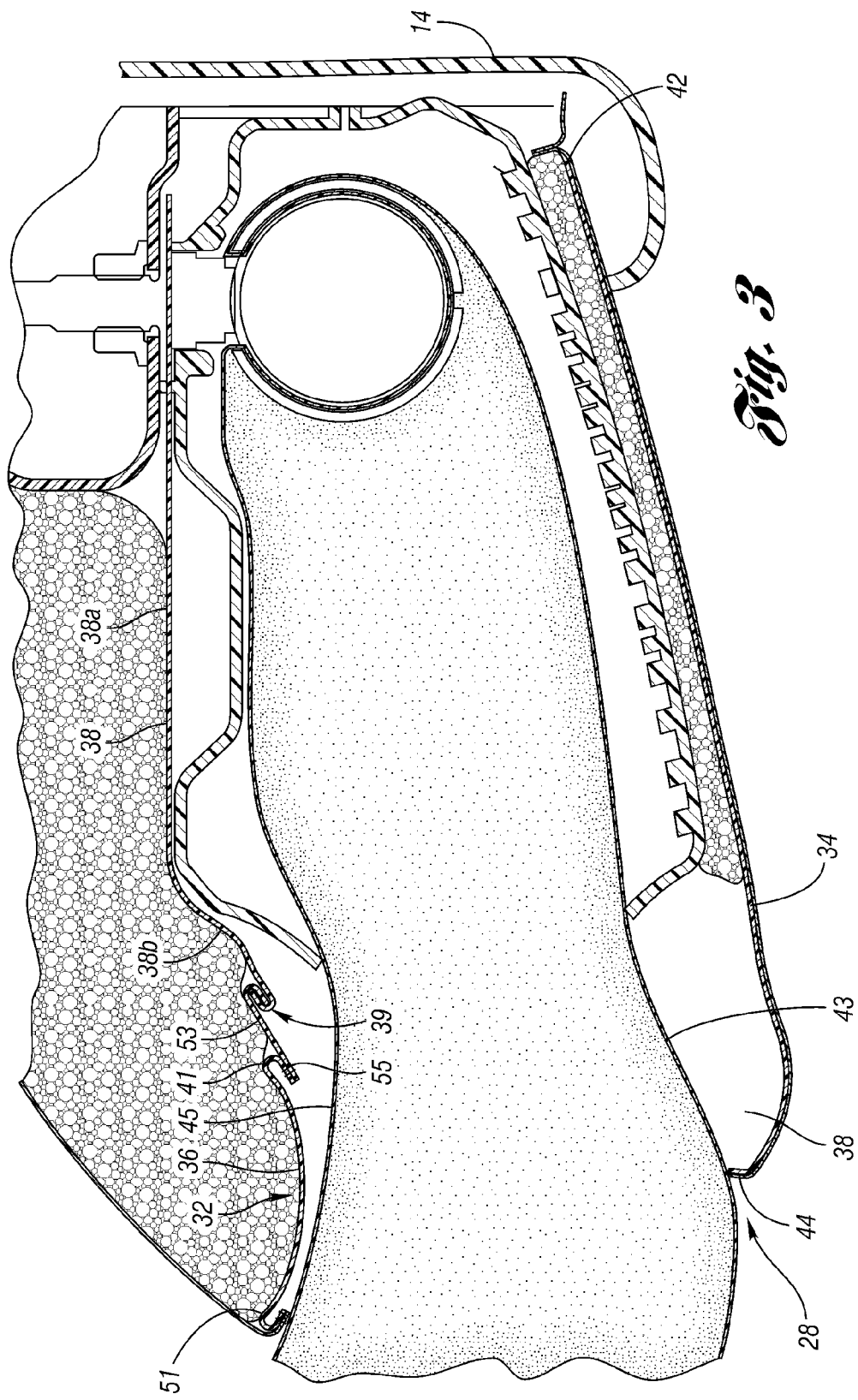

VEHICLE SEAT ASSEMBLY WITH DEFLECTOR INNER PANEL AIR BAG GUIDE RETAINER

BACKGROUND OF THE INVENTION

1. Field of the Invention

The present invention relates to a vehicle seat assembly, and in particular, a seat assembly including an air bag.

2. Background Art

Vehicles can be equipped with side air bags, which may be in the form of a side air curtain disposed in a headliner of the vehicle, or alternatively, may be an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness.

Prior vehicle seat assemblies equipped with side air bags and their manufacturing methods are disclosed in U.S. Pat. Nos. 5,749,597, 5,816,610, 5,927,749, 6,045,151, 6,237,934 and 6,588,838, for example.

SUMMARY OF THE INVENTION

Under the invention, a vehicle seat assembly is provided. In at least one embodiment, the vehicle seat assembly comprises a frame, a seat pad adjacent the frame, and a trim cover extending over the seat pad and including a release seam adjacent the seat pad with the release seam having a first end and a second end. In this embodiment, the vehicle seat assembly also includes an air bag assembly mounted on the frame within the trim cover in a spaced relationship from the release seam including an inflator and a folded air bag that is inflated by the inflator to unfold and project outwardly from the seat through the release seam of the trim cover. In this embodiment, the vehicle seat assembly also includes an air bag guide including an inner panel, an outer panel, and a deflector member. In at least this embodiment, the inner and outer panels are made of flexible material and the deflector member is made of a rigid material, and the outer panel have an inner end secured to the first end of the release seam and a second end secured to the trim cover at a location spaced from the release seam. In at least this embodiment, the deflector member has a leg member secured to the air bag assembly and a finger member, extending away from the leg member spaced from the release seam, with the leg member having a first hook member, and the inner panel extending between and connecting the second end of the release seam and the finger member end of the deflector member, and the inner panel having a second hook member releasably connected to the first hook member, with one of the hook members having at least one stop for inhibiting relative lateral movement of the hook members.

In at least one embodiment, the leg member at the deflector member extends generally parallel to the outer panel and the finger member extends generally traverse to the leg member. In yet another embodiment, the stitching connects the inner and outer panels to the trim cover adjacent the release seam.

In at least another embodiment, the first hook member of the finger member of the deflector member comprises an integral J-hook section that connects the inner panel to the deflector member. In still yet at least another embodiment, the second end of the inner panel has a stitched J-hook comprising the second hook member that connects to the first hook member.

In yet at least another embodiment, the vehicle seat assembly comprises a frame, a seat pad adjacent the frame, and a trim cover extending over the seat pad and including a release seam adjacent the seat pad, with the trim cover having an outer surface and an inner surface. In this embodiment, the vehicle seat assembly also includes an air bag assembly within the trim cover in a spaced relationship from the release seam including an inflator and a folded air bag that is inflated by the inflator to unfold and project outwardly from the seat through the air bag release seam of the trim cover, and an air bag guide including an inner panel, an outer panel, and a deflector member. In this embodiment, the inner and outer panels are made of flexible material and the deflector member is made of a rigid material, with the outer panel having an inner end secured to the first end of the release seam and a second end secured to the trim cover at a location spaced from the release seam, and the outer panel being located between the seat pad and the trim cover. In this embodiment, the deflector member has a leg member secured to the air bag assembly and a finger member extending from the leg member and spaced from the release seam, and the inner panel extends between and connects the second end of the release seam and the finger member of the deflector member.

In still yet at least another embodiment, the vehicle seat assembly comprises a frame, a seat pad mounted on the frame, a trim cover extending over the seat pad and including a release seam adjacent the seat pad, an air bag assembly mounted on the frame within the trim including an inflator and an air bag that is inflated by the inflator to project outwardly from the seat through the air bag release seam of the trim cover, and an air bag guide including an inner panel, an outer panel, and a deflector member. In this embodiment, the inner and outer panels are made of flexible material and the deflector member is made of a rigid material, with the outer panel having an inner end secured to the first end of the release seam and a second end secured to the trim cover at a location spaced from the release seam, and the deflector member having a leg member secured to the air bag assembly and a finger member, extending away from the leg member spaced from the release seam, and the inner panel extending between and connecting the second end of the release seam and the finger member of the deflector member, wherein the leg member at the deflector member extends generally parallel to the outer panel and the finger member extends generally traverse to the leg member, wherein the finger member of the deflector member has a first J-hook section that connects the inner panel to the deflector member, with the first J-hook section having a pair of stops at opposed length ends that inhibit relative movement of the inner panel and the deflector member.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

FIG. 3 is a view similar to FIG. 2 showing the parts in a different position; and FIG. 4 is a side view showing an embodiment of certain parts of the seat assembly shown in FIG. 1.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least one embodiment, the air bag assembly 20 also includes a housing 40 which at least partially surrounds the air bag 22 and the inflator 24.

Also shown in FIG. 2 is a portion of a seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release tear seam 28 which in at least one embodiment is adjacent to a side of the seat pad 16.

The air bag assembly 20 is located within the trim cover 18 and may be conventionally mounted, such as on the frame 26, adjacent the air bag release seam 28 but in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 and includes an outer panel 34, an inner panel 36, and a deflector 38. The outer and inner panels 34 and 36 and the deflector 38 are each made of any suitable material effective to protect the seat pad 16 during deployment of the air bag 22. For example, the outer and inner panels 34 and 36 may be made of a woven or non-woven cloth material, which may include natural or synthetic materials such as nylon or a fleece material. One material that is found to be effective for the panels 34 and 36 is a polyester material, of the type from which the air bag 22 may be manufactured. The outer panel 34 can optionally be omitted if the material strength of the inner panel 36 and deflector 38 are sufficient to prevent excessive stretching during deployment.

A more rigid material is used for deflector 38. The deflector 38 helps to facilitate proper location of the airbag assembly 20 during assembly of the seat assembly 10. The deflector 38 can be made of any suitable relatively rigid material such as a rigid plastic such as nylon, PP (polypropylene), PE (polyethylene), and can be made by any suitable process such as injection molding, vacuum forming, and extrusion. In at least one embodiment, the deflector 38 is made of a material having a flexural modulus of 800 to 3000 MPa, in another embodiment of 1800 to 2500 MPa, and in yet another embodiment of 2000 to 2350 MPa. Flexural modulus can be measured by ASTM D790. Regardless of the type of material used to make components 34, 36 and 38 of the air bag guide 32, the use of the air bag guide 32 can be helpful in reducing friction on the air bag 22 as it deploys. This is because the air bag guide 32 inhibits contact between the deploying air bag 22 and the seat pad 16 and helps to prevent small particles from separating from the seat pad and being introduced into the vehicle compartment.

The outer panel 34 of the air bag guide 32 includes an inner extremity 42 that is attached suitably to the trim cover 18 at a location spaced rearward of the tear seam 28. The outer extremity 44 of the outer panel 34 is attached to a first end of the tear seam 28. In at least one embodiment, the outer panel 34 has a length of 10 to 60 cm, a width of 5 to 25 cm, and a thickness of 0.5 to 5 mm. In at least another embodiment, the outer panel 34 has a length of 15 to 50 cm, and in yet another embodiment of 20 to 40 cm. In at least another embodiment, the outer panel 34 has a width of 7.5 to 20 cm, and in yet another embodiment of 9 to 20 cm. In at least another embodiment, the outer panel 34 has a thickness of 1 to 4 mm. The outer panel 34 may have any suitable size and/or shape and in one embodiment has a trapezoidal shape decreasing in length as it extends towards the tear seam 28.

The outer extremity 51 of the inner panel 36 is attached to a second end of the tear seam 28, opposite the first end of the tear seam. The inner panel 36 of the air bag guide 32 includes an inner extremity 41 that is attached to a J-hook section 53 at a location spaced between the tear seam 28 and the deflector 38. In at least one embodiment, the inner panel 36 has a length of 10 to 60 cm, a width of 5 to 25 cm, and a thickness of 0.5 to 5 mm. In at least another embodiment, the inner panel 36 has a length of 15 to 50 cm, and in yet another embodiment of 20 to 40 cm. In at least another embodiment, the inner panel 36 has a width of 7.5 to 20 cm, and in yet another embodiment of 9 to 20 cm. In at least another embodiment, the inner panel 36 has a thickness of 1 to 4 mm. The inner panel 36 may have any suitable size and/or shape and in one embodiment has a trapezoidal shape decreasing in length as it extends towards the tear seam 28.

The J-hook section 53 can be secured to the inner extremity 41 of the inner panel 36 in any suitable manner. For instance, the J-hook section 53 can be attached to the inner panel 36 via ultrasonic welding, adhesive, etc., among other suitable manners. In at least the illustrated embodiment, stitching 55 secures the J-hook section 39 to the inner panel 36. Also, in one embodiment, the J-hook section 53 could be secured to the inner panel 36 of the air bag guide 32 via in situ molding of the polymeric seat pad 16.

The deflector 38 is generally L-shaped and includes a leg member 38a and a finger member 38b. In at least this illustrated embodiment, the leg member 38a of the deflector 38 is secured to the housing 40, via bolt 61. The deflector 38 may have any suitable shape and/or size.

In at least one embodiment, the leg member 38a of the deflector 38 extends 10 to 60 cm in length, 3 to 20 cm in width, and is 0.5 to 5 mm in thickness. In at least another embodiment, the leg member 38a of the deflector 38 has a length of 15 to 55 cm, and in yet another embodiment of 20 to 50 cm. In at least another embodiment, the leg member 38a of the deflector 38 has a width of 4 to 15 cm, and in yet another embodiment of 5 to 12 cm. In at least another embodiment, the leg member 38a of the deflector 38 has a thickness of 1 to 3 mm.

In at least one illustrated embodiment, the finger member 38b of the deflector 38 extends generally transverse from the forward end of the leg member 38a of the deflector. In at least one embodiment, the finger member 38b of the deflector 38 extends 2 to 40 cm in length, 1 to 15 cm in width, and 0.5 to 5 mm in thickness. In at least another embodiment, the finger member 38b of the deflector 38 has a length of 5 to 30 cm, and in yet another embodiment of 10 to 20 cm. In at least another embodiment, the finger member 38b of the deflector 38 has a width of 1.5 to 10 cm, and in yet another embodiment of 2 to 7 cm. In at least another embodiment, the finger member 38b of the deflector 38 has a thickness of 1 to 3 mm.

The finger member 38b includes at least one J-hook section 39 that releasably interlocks with the J-hook section 53 on the inner panel 36 to releasably secure the deflector 38 with the inner panel 36. The J-hook sections 39 and 53 facilitate assembly of the trim cover 18 and thus the seat assembly 10.

In at least one embodiment, the J-hook sections 53 and 39 comprises one J-hook. In at least another embodiment, the J-hook sections 53 and 39 comprise a plurality of J-hooks, such as 2-8 J-hooks. The J-hook sections 39 and 53 enable cover 18 to be readily assembled and disassembled if desired. Using a plurality of J-hook sections 39 and 53 also enable several concentrated tear propagations by concentrating forced on localized areas of the seam 28.

The J-hook section 39 can be secured to the deflector member 38 in any suitable manor. Exemplary manners are discussed above with respect to J-hook section 53 and the inner panel 36. In at least one embodiment, the J-hook section 39 on the deflector member 38 is integrally molded to the distal end of the finger member 38b of the deflector 38. In at least another embodiment, the J-hook section 39 could be secured to the finger member 38b in any suitable manner, such as by sewing, ultrasonic welding, and adhesive. In at least one embodiment, the J-hook section 39 is made of the same material and by the same process as the deflector 38, but could be made of a more or less rigid material. Suitable other materials include, but are not limited to, ferrous and non-ferrous metals.

In at least one embodiment, the J-hook sections 39 and 53 each have a general thickness of 0.5 to 5 mm (millimeters), in other embodiments of 0.75 to 3.5 mm, and in yet other embodiments of 1.0 to 2.0 mm.

In at least one embodiment, the J-hook sections 39 and 50 each have a length of 250 to 500 mm, in other embodiments of 300 to 450 mm, and in yet other embodiments of 350 to 400 mm. In at least one embodiment, the J-hook sections 39 and 53 each have a length of 25 to 150 mm, in other embodiments of 40 to 125 mm, and in yet other embodiments of 50 to 100 mm.

As best shown in FIG. 4, J-hook section 39 has stops 62 disposed at opposed ends. The stops 62 help to inhibit relative lateral movement of the J-hook sections 39 and 53. The stops 62 can be spaced any where along the length of the J-hook section 39. Moreover, stops 62 could be placed on J-hook section 53 either in addition to, or alternatively to, J-hook section 39. The stops 62 can constitute any suitable structure for inhibiting relative movement between sections 39 and 53, such as clips, thicker sections, roughened surfaces, and/or crimps, but in at least one embodiment comprise crushed areas that limit relative movement of the sections 39 and 53. While the stops 62 may be spaced apart any suitable distance, in at least one embodiment they are spaced apart 0.75 to 7 cm, in another embodiment 1 to 6 cm and in yet another embodiment 2 to 5 cm. In at least one embodiment, only one stop 62 is present.

In at least one embodiment, the air bag guide 32 is effective to prohibit at least substantially all contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag. The deflector 38 and the J-hook sections 39 and 53 also help to provide a reliable predetermined exit path essentially to the tear seam 28 and inhibit the air bag 22 from traveling under the seat cover 18 to the inboard area of the seat assembly 10.

In at least one embodiment, the outer and inner panels 34 and 36 of the air bag guide 32 form a deployment channel 38 for the air bag 22. As shown in FIGS. 2-3, the deployment channel 38 is oriented to facilitate deployment of the air bag 22 through the seam 28 in the trim cover 18.

Upon deployment of the air bag assembly 20, as shown schematically in FIG. 3, the deploying air bag 22 causes relative movement of the flexible outer and inner panels 34 and 36 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 38, the air bag guide 32 acts as a blocking member that forms a barrier on two sides 43, 45 of the air bag 22, thereby inhibiting contact between the air bag 22 and the seat pad 16. Thus, the seat pad 16 is moved away from the air bag 22 as it deploys through the deployment channel 38.

As shown in FIG. 3, the attachment of the outer extremities 43, 51 of the panels 34 and 36 to opposed ends of the seam 28 helps to facilitate deployment of the air bag 22 through the seam 28. This is because the deployment channel 38 opens as the air bag 22 is deployed and directs the deploying air bag 22 to exert an outward force on the trim cover 18 at the seam 28; this helps to open the seam 28 to provide an easy exit for the air bag 22. Also deflector 38 and the panels 34 and 36 help to ensure that the air bag 22 will deploy in the predetermined desired manner through the seam 18 by providing a continuous barrier attached to one side of the seam 28. Because of deflectors 38 relatively consistent manufacturing process, use of deflector 38 can help ensure relatively consistent deployment of air bag in seat assemblies 10 employing the use of deflector 38.

While embodiments of the invention have been illustrated and described, it is not intended that these embodiments illustrate and describe all possible forms of the invention. For instance, rather than the use of the J-hook sections, alternative attachment mechanisms could be used, such as clips or buckles. Rather, the words used in the specification are words of description rather than limitation, and it is understood that various changes may be made without departing from the spirit and scope of the invention.

What is claimed is:

1. A vehicle seat assembly, comprising:
a frame;
a seat pad adjacent the frame;
a trim cover extending over the seat pad and including a release seam adjacent the seat pad, the release seam having a first end and a second end;
an air bag assembly mounted on the frame within the trim cover in a spaced relationship from the release seam, the air bag assembly including an inflator and a folded air bag that is inflated by the inflator to unfold and project outwardly from the seat through the release seam of the trim cover;
an air bag guide including an inner panel, an outer panel, and a rigid plastic deflector member, the inner and outer panels being made of flexible material and the deflector member being made of a rigid material;
the outer panel having an inner end secured to the first end of the release seam;
the deflector member having a leg member secured to the air bag assembly and a finger member, extending away from the leg member spaced from the release seam, the leg of the deflector having a length of 10 to 60 cm, the finger member having a length of 2 to 40 cm and a first hook member; and
the inner panel extending between and connecting the second end of the release seam and the finger member of the deflector member, the inner panel having a second hook member releasably connected to the first hook member, one of the hook members; wherein the first and second hook members are located in front of the airbag having at least one stop for inhibiting relative lateral movement of the hook members.

2. The vehicle seat assembly of claim 1, wherein the leg member of the deflector member extends generally parallel to the outer panel and the finger member extends generally traverse to the leg member.

3. The vehicle seat assembly of claim 2, wherein stitching connects the inner and outer panels to the trim cover adjacent the release seam.

4. The vehicle seat assembly of claim 2, wherein the outer panel has a length of 10 to 60 cm and a width of 5 to 25 cm, and the inner panel has a length of 10 to 60 cm and a width of 5 to 25 cm.

5. The vehicle seat assembly of claim 1, wherein the deflector member is a unitary member having a flexural modulus of 800 to 3000 MPa, as measured by ASTM Test Method No. D790.

6. The vehicle seat assembly of claim 5, wherein the leg member of the deflector member has a width of 5 to 12 cm.

7. The vehicle seat assembly of claim 1, wherein the first hook member of the finger member of the deflector member comprises an integral J-hook section that connects the inner panel to the deflector member.

8. The vehicle seat assembly of claim 1, wherein a second end of the inner panel has a stitched J-hook comprising the second hook member that connects to the first hook member.

9. A vehicle seat assembly, comprising:
a frame;
a seat pad adjacent the frame;
a trim cover extending over the seat pad and including a release seam adjacent the seat pad, the trim cover having an outer surface and an inner surface;
an air bag assembly within the trim cover in a spaced relationship from the release seam, the air bag assembly including an inflator and a folded air bag that is inflated by the inflator to unfold and project outwardly from the seat through the air bag release seam of the trim cover; and
an air bag guide including an inner panel, an outer panel, and a deflector member, the inner and outer panels being made of flexible material and the deflector member being made of a rigid material;
the outer panel having an inner end secured to the first end of the release seam, the outer panel being located between the seat pad and the trim cover;
the deflector member having a leg member secured to the air bag assembly and a finger member extending from the leg member and spaced from the release seam, the leg member extending alongside at least a portion of the folded air bag and having a length of 20 to 50 cm; and
the inner panel extending between and connecting the second end of the release seam and the finger member of the deflector member, the leg member of the deflector member extending generally parallel to the outer panel, and the finger member having a length of 10 to 20 cm and extending generally traverse to the leg member in front of the air bag.

10. The vehicle seat assembly of claim 9, wherein stitching connects the inner and outer panels to the trim cover adjacent the release seam.

11. The vehicle seat assembly of claim 10, wherein the leg member of the deflector member has a width of 5 to 12 cm and the finger portion of the deflector member has a width of 2 to 7 cm.

12. The vehicle seat assembly of claim 9, wherein the outer panel has a length of 10 to 60 cm and a width of 5 to 25 cm, and the inner panel has a length of 10 to 60 cm and a width of 5 to 25 cm.

13. The vehicle seat assembly of claim 9, wherein the finger member of the deflector member has an integral J-hook section that connects the inner panel to the deflector member.

14. The vehicle seat assembly of claim 13, wherein the inner panel has a stitched J-hook that connects to the J-hook section of the deflector member.

15. The vehicle seat assembly of claim 9, wherein the deflector member has a hole in the leg member for bolting the air bag assembly.

16. A vehicle seat assembly, comprising:
a frame;
a seat pad mounted on the frame;

a trim cover extending over the seat pad and including a release seam adjacent the seat pad;

an air bag assembly mounted on the frame within the trim cover, the air bag assembly including an inflator and an air bag that is inflated by the inflator to project outwardly from the seat through the air bag release seam of the trim cover;

an air bag guide including an inner panel, an outer panel, and a rigid plastic deflector member, the inner and outer panels being made of flexible material and the deflector member being made of a rigid material;

the outer panel having an inner end secured to the first end of the release seam;

the deflector member having a leg member secured to the air bag assembly and a finger member, extending away from the leg member spaced from the release seam; and the inner panel extending between and connecting the second end of the release seam and the finger member of the deflector member, wherein the leg member of the deflector member extends generally parallel to the outer panel alongside the air bag and the finger member extends generally traverse to the leg member in front of the air bag, wherein the finger member of the deflector member has a first J-hook section that connects the inner panel to the deflector member, the first J-hook section having a pair of stops at opposed length ends that inhibit relative movement of the inner panel and the deflector member.

17. The vehicle seat assembly of claim 16 wherein the second end of the inner panel has a second J-hook section that connects to the J-hook section of the deflector member.

18. The vehicle seat assembly of claim 16, wherein the leg member of the deflector member has a width of 5 to 12 cm.

* * * * *